United States Patent
Osse

(10) Patent No.: US 11,224,904 B2
(45) Date of Patent: Jan. 18, 2022

(54) DEVICE AND METHOD FOR IN BATCH PROCESSING OF SPRAY CANS

(71) Applicant: DESPRAY HOLDING B.V., Almelo (NL)

(72) Inventor: Eelco Maarten Osse, Almelo (NL)

(73) Assignee: DESPRAY HOLDING B.V., Almelo (NL)

( * ) Notice: Subject to any disclaimer, the term of this patent is extended or adjusted under 35 U.S.C. 154(b) by 0 days.

(21) Appl. No.: 17/053,892

(22) PCT Filed: May 9, 2019

(86) PCT No.: PCT/NL2019/000006
§ 371 (c)(1),
(2) Date: Nov. 9, 2020

(87) PCT Pub. No.: WO2019/216760
PCT Pub. Date: Nov. 14, 2019

(65) Prior Publication Data
US 2021/0237133 A1    Aug. 5, 2021

(30) Foreign Application Priority Data
May 11, 2018    (NL) ...................................... 1042864

(51) Int. Cl.
*B09B 3/00* (2006.01)
*B65B 69/00* (2006.01)
(52) U.S. Cl.
CPC .......... *B09B 3/0058* (2013.01); *B65B 69/005* (2013.01); *B65B 69/0041* (2013.01); *B09B 2220/02* (2013.01)
(58) Field of Classification Search
CPC . B09B 3/0058; B09B 2220/02; B65B 69/005; B65B 69/0041
See application file for complete search history.

(56) References Cited

U.S. PATENT DOCUMENTS 3,438,548 A * 4/1969 Ceyba ................... B09B 3/0058
222/80
4,459,906 A * 7/1984 Cound .................. B09B 3/0058
100/116
(Continued)

FOREIGN PATENT DOCUMENTS

ES        2261012 A1    11/2006
JP    H05277796 A    10/1993
(Continued)

OTHER PUBLICATIONS

International Search Report and Written Opinion for Patent Application No. PCT/NL2019/000006, dated Apr. 14, 2020, 12 pages.

*Primary Examiner* — Timothy L Maust
(74) *Attorney, Agent, or Firm* — Kacvinsky Daisak Bluni PLLC

(57) ABSTRACT

A device for batch-wise processing of spray cans includes a first chamber for batch-wise separation of spray cans into solid parts, liquid and gas by separating means, feed means for feeding the spray cans into the first chamber, and first discharge means for discharging the solid parts from the first chamber. A wall of the first chamber is provided with a plurality of passages for allowing passage of the liquid and the gas but unsuitable for allowing passage of the solid parts, a second chamber surrounds the first chamber or at least the portion of the wall provided with the passages. The device further includes second discharge means for discharging the gas from the second chamber, and third discharge means for discharging the liquid from the second chamber. A method for batch-wise processing of spray cans using the aforementioned device.

8 Claims, 1 Drawing Sheet

(56) References Cited

U.S. PATENT DOCUMENTS

| | | | | |
|---|---|---|---|---|
| 5,114,043 | A | * | 5/1992 | Collins, Jr. .......... B65B 69/0041 141/65 |
| 5,230,917 | A | * | 7/1993 | Peters ................... B09B 3/0058 426/478 |
| 6,178,882 | B1 | * | 1/2001 | Wagner ................. B09B 3/0058 100/240 |
| 6,360,678 | B1 | | 3/2002 | Komatsu et al. |
| 6,834,690 | B2 | * | 12/2004 | Michaud ............... B09B 3/0058 141/1 |
| 8,002,211 | B2 | * | 8/2011 | Lewis, Jr. ............. B02C 13/286 241/79.1 |
| 8,353,473 | B2 | * | 1/2013 | Lewis, Jr. ........... B02C 18/2233 241/101.4 |
| 8,684,437 | B1 | * | 4/2014 | Collins .................. B65F 3/001 296/24.3 |
| 10,589,486 | B2 | * | 3/2020 | Oude Grotebevelsborg ............... B30B 9/067 |
| 2011/0108648 | A1 | * | 5/2011 | Woolcock ............... B02C 18/14 241/101.5 |

FOREIGN PATENT DOCUMENTS

| | | |
|---|---|---|
| JP | 2008000813 A | 1/2008 |
| JP | 2008073650 A | 4/2008 |

* cited by examiner

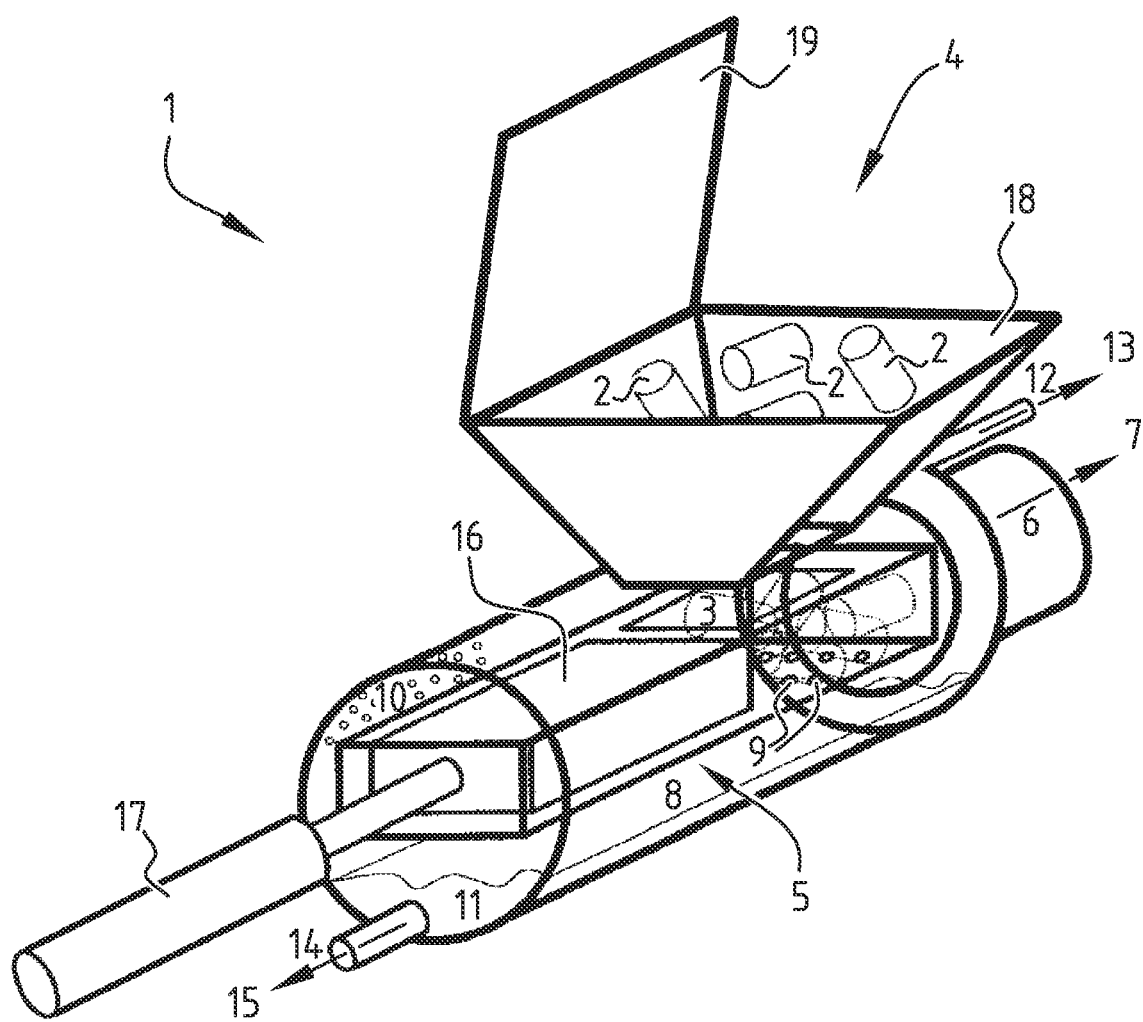

DEVICE AND METHOD FOR IN BATCH PROCESSING OF SPRAY CANS

This is a national stage application filed under 35 U.S.C. § 371 of international application PCT/NL2019/000006, filed May 9, 2019, which claims priority to Netherlands Patent Application No. 1042864, filed May 11, 2018, the entirety of which applications are hereby incorporated by reference herein.

FIELD OF THE INVENTION

The invention relates to a device for batch-wise processing of spray cans, the device comprising:
- a first chamber configured and suitable tor batch-wise separation of spray cans into solid parts, liquid and gas by means of separating means provided for this purpose;
- feed means for feeding the spray cans into the first chamber; and
- first discharge means for discharging the solid parts from the first chamber.

The invention also relates to a method for batch-wise processing of spray cans by means of such a device, the method comprising of:
- feeding the spray cans into the first chamber by means of the feed means;
- separating the spray cans into solid parts, liquid and gas in the first chamber by means of the separating means; and
- discharging the solid parts from the first chamber by means of the discharge means.

BACKGROUND OF THE INVENTION

A spray can is a form of packaging comprising a container, generally of tin, aluminium, plastic or glass, which is provided with a valve. The container is filled with an 'active substance', for instance paint, hairspray, shaving foam, whipping cream, glue, spray foam, oil or a toxin, and with a 'propellant gas', for instance butane or propane. When the valve is pressed, the active substance squirts out in the form of a mist, a foam or a powder.

The term 'propellant gas' refers to the chemical substance which provides for the necessary pressure build-up in the container, in a spray can or container, and during processing of spray cans in a device according to the invention, 'propellant gas' occurs both in gaseous and liquid form, and optionally also in dissolved form. Liquid 'propellant gas' sometimes also serves as solvent for the active substance. In order to avoid confusing and physically incorrect terms such as 'liquid (propellant) gas' and 'gaseous (propellant) gas' use is in the context of the invention always made of the terms 'propellant', 'gaseous propellant' and 'liquid propellant'. In most cases the propellant in the container will be largely liquid, wherein its vapour pressure provides for the necessary pressure. The terms 'gas' and 'liquid' are always understood to mean respectively a 'random gas (or gas mixture)' and a 'random liquid (or liquid mixture or solution)'.

Diverse embodiments of methods for processing spray cans are known. Referred to here are used spray cans with a quantity of gas and/or liquid still remaining therein, but possibly also unused, still completely filled, spray cans. The spray cans are here processed one by one, in series or in batches. The containers can here be emptied, disassembled and reused. The spray cans or the containers are however generally perforated and/or shredded/cut into pieces and/or compacted herein. Gas and liquid can here be captured, and solid material of the containers can be collected, for further processing, destruction or reuse.

ES2261012A1 thus describes a method and a machine for separating spray cans. The spray cans are here supplied one by one and perforated and flattened by special toothed wheels. The remaining solid material drops down into a chamber, is there captured and discharged laterally. The liquid drops down from the chamber and into a capturing container and is discharged from there. The gas is discharged from the chamber and burnt off. U.S. Pat. No. 4,459,906A describes an apparatus for evacuating spray cans and making them into smaller pieces. The spray cans are here fed one by one into a chamber, there perforated by means of a pin and flattened by means of a ram. The remaining solid material drops down into a chamber, is there captured and discharged laterally. The liquid and the gas find their way into the space in which the pin is situated and, from there, are discharged via a conduit to a tank. From the tank, the liquid is discharged on the underside and the gas on the upper side. Examples of devices and methods for batch-wise processing of spray cans, i.e. multiple spray aims at a time/in a single process, are described in FR2664834A1, DE9107585U1 and WO2010125393A1.

Known devices for processing spray cans are not suitable for batch-wise processing of spray cans and/or are too complex, susceptible to malfunction and expensive. The present invention now provides an improved solution for batch-wise processing of spray cans wherein propellant, active substance and solid material of the containers and valves are discharged separately for further processing, destruction or reuse.

SUMMARY OF THE INVENTION

The invention provides a device of the stated type, characterized in that:
- a wall of the first chamber is provided with a plurality of passages configured and suitable for allowing passage of the liquid and the gas but unsuitable for allowing passage of the solid parts; and the device also comprises:
- a second chamber which surrounds the first chamber or at least the portion of the wall provided with the passages;
- second discharge means for discharging the gas from the second chamber; and
- third discharge means for discharging the liquid from the second chamber.

The invention also provides a method of the stated type, characterized in that the method also comprises of:
- allowing passage of the liquid and the gas from the first chamber to the second chamber through the passages, wherein the solid parts are not allowed to pass;
- discharging the gas from the second chamber by means of the second discharge means; and
- discharging the liquid from the second chamber by means of the third discharge means.

Spray cans can thus be separated in batches, wherein propellant, active substance and solid material of the containers are discharged, captured and collected separately for further processing, destruction or reuse.

The separating means can here comprise compacting means and/or perforating means and/or cutting means for compacting and/or perforating and/or cutting into pieces spray cans in the first chamber. The solid material of the spray cans or the containers is thus made into smaller pieces and/or compacted and/or escaping of gas and/or liquid from the containers is facilitated.

A device according to the invention can also comprise means configured and suitable for separating under reduced pressure propellant present in the liquid out from the liquid in gaseous form. Propellant which remains in the captured active substance and is liquid and/or gaseous and/or dissolved therein can be separated therefrom in gaseous form.

BRIEF DESCRIPTION OF THE DRAWINGS

The invention will be further elucidated hereinbelow on the basis of exemplary embodiments. FIG. 1 shows more or less schematically a preferred embodiment of a device according to the invention.

EXEMPLARY EMBODIMENTS

FIG. 1 shows a device (1) for batch-wise processing of spray cans (2), comprising feed means (4) for feeding the spray cans (2) into a first chamber (3). The feed means (4) comprise here a funnel (18) with an underside or outfeed side connected to the first chamber (3) and with an upper side or in feed side provided with a cover (19) for closing the funnel (18) during separating in the first chamber (3) of spray cans (2) present therein. The device (1) also comprises separating means (5), here compacting means comprising a ram (16) movable in the first chamber (3) and driven by a hydraulic cylinder (17), for separating, here through compacting, spray cans (2) present in the first chamber (3). In other embodiments of a device according to the invention the separating means comprise perforating means and/or cutting means for perforating and/or cutting into pieces spray cans or containers. The device (1) also comprises first discharge means, here comprising a closable opening in a wall of the first chamber (3), for discharging (6) solid material (7) or compacted material of containers and valves from the first chamber (3).

According to the invention, the device (1) now also comprises a second chamber (8) which largely surrounds the first chamber (3). A wall of the first chamber (3) is provided here with passages (9) in the form of a relatively large number of perforations for the purpose of allowing gas and liquid to pass from the first chamber (3) to the second chamber (8). The passages (9) have dimensions such that gas and liquid are readily allowed to pass, but solid material (7) or compacted material of containers and valves is stopped. The device (1) here also comprises second discharge means for discharging (12) gas (13) or gaseous propellant from the second chamber (8) and third discharge means for discharging (14) liquid (15) or active substance from the second chamber (8).

For the purpose of processing spray cans (2) they are fed into the first chamber (3) by means of the feed means (4) and separated or compacted batch-wise in the first chamber (4) by means of the separating means (5) or the compacting means or the ram (16), wherein solid material (7) or compacted material of containers and valves is discharged (6) from the first chamber (4) by means of the first discharge means.

According to the invention, gas and liquid are now allowed to pass from the first chamber (3) through the passages (9) to the second chamber (8). Gas (13) or gaseous propellant is discharged (12) from the second chamber (8) by means of the second discharge means and liquid (15) or active substance is discharged (14) from the second chamber (8) by means of the third discharge means.

Under reduced pressure propellant present in the liquid is separated out, here in a third chamber (not shown), in gaseous form from the liquid. Propellant which remains in the captured active substance and is liquid and/or gaseous and/or dissolved therein can thus be separated therefrom in gaseous form and captured.

A device according to the invention is of relatively simple construction, with a minimum of (moving) parts, robust and not very susceptible to malfunction, and is thereby relatively inexpensive to purchase, use and maintain. Large numbers of spray cans can be processed quickly and properly according to a method according to the invention.

It will be apparent that the invention is not limited to the given exemplary embodiments, but that within the scope of the invention diverse variants obvious to a skilled person are possible. The invention can thus also be applied in the processing of containers with content other than spray cans.

REFERENCE NUMERALS USED 1 device
2 spray can
3 first chamber
4 feed means (spray cans)
5 separating means
6 discharge of solid material (from first chamber)
7 solid parts (containers and valves)
8 second chamber
9 passage (gas, liquid)
10 gas
11 liquid
12 discharge of gas (from second chamber)
13 gas (gaseous propellant)
14 discharge of liquid (from second chamber)
15 liquid (active substance)
16 ram (compacting means)
17 hydraulic cylinder (ram drive)
18 funnel (feed of spray cans)
19 cover (closing of funnel)

The invention claimed is:

1. A device for batch-wise processing of spray cans, the device comprising:
   a first chamber configured for batch-wise separation of spray cans into solid parts, liquid, and gas using one of a compactor, a perforator, and a cutter;
   a funnel for feeding the spray cans into the first chamber; and
   a first outlet comprising a closable opening in a wall of the first chamber for discharging the solid parts from the first chamber, wherein:
   the device also comprises:
      a second chamber which completely surrounds the first chamber;
      a second outlet for discharging the gas from the second chamber; and
      a third outlet for discharging the liquid from the second chamber;
   wherein a wall of the first chamber includes a plurality of passages configured for allowing passage of the liquid and the gas to the second chamber while preventing passage of the solid parts.

2. The device as claimed in claim 1, wherein the compactor is configured for compacting the spray cans.

3. The device as claimed in claim 2, wherein the compactor comprises a ram movable in the first chamber.

4. The device as claimed in claim 1 wherein the perforator is configured for perforating the spray cans.

5. The device as claimed in claim 1 wherein the cutter is configured for cutting the spray cans into pieces.

6. The device as claimed in claim 1 wherein the device comprises a third chamber coupled to the second chamber, the third chamber configured to separate, under reduced pressure, propellant present in the liquid out from the liquid in gaseous form.

7. A method for batch-wise processing of spray cans using the device as claimed in claim 1, the method comprising of:
   feeding the spray cans into the first chamber by the funnel;
   separating the spray cans into solid parts liquid and gas in the first chamber using one of a compactor, a perforator, and a cutter;
   discharging the solid parts from the first chamber via the closable opening in the wall of the first chamber,
   allowing passage of the liquid and the gas from the first chamber to the second chamber through the passages, wherein the solid parts are not allowed to pass;
   discharging the gas from the second chamber via the second outlet; and
   discharging the liquid from the second chamber via the third outlet.

8. The method as claimed in claim 7, further comprising separating under reduced pressure propellant present in the liquid out from the liquid in gaseous form.

* * * * *